United States Patent
Takenaga

(10) Patent No.: US 10,545,478 B2
(45) Date of Patent: Jan. 28, 2020

(54) SUBSTRATE PROCESSING SYSTEM, CONTROL DEVICE, GROUP CONTROLLER, AND HOST COMPUTER

(71) Applicant: Tokyo Electron Limited, Tokyo (JP)

(72) Inventor: Yuichi Takenaga, Yamanashi (JP)

(73) Assignee: Tokyo Electron Limited, Tokyo (JP)

(*) Notice: Subject to any disclaimer, the term of this patent is extended or adjusted under 35 U.S.C. 154(b) by 28 days.

(21) Appl. No.: 15/939,757

(22) Filed: Mar. 29, 2018

(65) Prior Publication Data

US 2018/0284716 A1  Oct. 4, 2018

(30) Foreign Application Priority Data

Mar. 30, 2017 (JP) ................. 2017-068410

(51) Int. Cl.
    *G05B 19/18* (2006.01)
    *G05B 19/406* (2006.01)

(52) U.S. Cl.
    CPC ......... *G05B 19/188* (2013.01); *G05B 19/406* (2013.01); *G05B 2219/45031* (2013.01)

(58) Field of Classification Search
    None
    See application file for complete search history.

(56) References Cited

U.S. PATENT DOCUMENTS

| 8,834,631 | B2* | 9/2014 | Hirose | H03K 21/023 118/699 |
| 2005/0095774 | A1* | 5/2005 | Ushiku | G05B 19/4184 438/222 |
| 2007/0010906 | A1* | 1/2007 | Abe | H01L 21/67253 700/121 |
| 2007/0135957 | A1* | 6/2007 | Ogawa | G05B 17/02 700/109 |
| 2008/0183412 | A1* | 7/2008 | Funk | G01B 11/0616 702/97 |
| 2008/0183413 | A1* | 7/2008 | Deshpande | G03F 7/70491 702/99 |
| 2012/0323855 | A1* | 12/2012 | Koyama | G05B 19/41875 707/661 |
| 2013/0183443 | A1* | 7/2013 | Hirose | H03K 21/023 427/248.1 |
| 2017/0285613 | A1* | 10/2017 | Asai | G05B 19/406 |

FOREIGN PATENT DOCUMENTS

JP  2010-165729 A  7/2010

* cited by examiner

*Primary Examiner* — Ramesh B Patel
(74) *Attorney, Agent, or Firm* — Abelman, Frayne & Schwab

(57) ABSTRACT

Disclosed is a substrate processing system including a substrate processing apparatus configured to execute a predetermined processing on a substrate accommodated in a processing container, an input receiving unit configured to receive an input of a set value for executing the predetermined processing, and a determination unit configured to determine whether or not the set value received by the input receiving unit is valid based on the set value received by the input receiving unit and a characteristic of the substrate processing apparatus.

11 Claims, 10 Drawing Sheets

FIG. 7A
INPUT HISTORY

| INPUT HISTORY ID | RECIPE | SET VALUE (°C) | PRESENCE OR ABSENCE OF PROCESSING RESULT |
|---|---|---|---|
| 1 | 1 | 759.1 | 1 |
| 2 | 1 | 759.0 | 1 |
| 3 | 1 | 760.6 | 1 |
| 4 | 1 | 759.8 | 1 |
| 5 | 1 | 759.9 | 1 |
| 6 | 1 | 759.4 | 1 |
| 7 | 1 | 759.6 | 1 |
| 8 | 1 | 760.5 | 1 |
| 9 | 1 | 760.4 | 1 |
| 10 | 1 | 759.7 | 1 |
| 11 | 2 | 759.5 | 1 |
| 12 | 1 | 760.5 | 0 |

FIG. 7B
STATISTICAL VALUE CALCULATED FROM INPUT HISTORY

| AVERAGE (°C) | 759.8 |
|---|---|
| 1σ (°C) | 0.56 |

FIG. 7C
PROPER RANGE WHEN 1σ OF INPUT HISTORY IS SET TO PROPER RANGE

| UPPER LIMIT (°C) | 760.36 |
|---|---|
| LOWER LIMIT (°C) | 759.24 |

FIG. 7D
NEWLY INPUT VALUE AND DETERMINED RESULT

| Case-A (°C) | 760.4 | NOT VALID |
|---|---|---|
| Case-B (°C) | 760.3 | VALID |

FIG. 8

WARNING
There is a zone greatly deviating from a neighboring zone in terms of set value. Please check whether this set value is proper.

FIG. 9

WARNING
There is a difference of 1σ or more between this set value and a previously applied set value. Please check whether this set value is proper.

SUBSTRATE PROCESSING SYSTEM, CONTROL DEVICE, GROUP CONTROLLER, AND HOST COMPUTER

CROSS-REFERENCE TO RELATED APPLICATIONS

This application is based on and claims priority from Japanese Patent Application No. 2017-068410 filed on Mar. 30, 2017 with the Japan Patent Office, the disclosure of which is incorporated herein in its entirety by reference.

TECHNICAL FIELD

The present disclosure relates to a substrate processing system, a control device, a group controller, and a host computer.

BACKGROUND

In the related art, a substrate processing apparatus for executing a predetermined processing on a substrate such as, for example, a semiconductor wafer has been used in a semiconductor manufacturing process. The substrate processing apparatus operates according to a large number of set values (e.g., recipes and apparatus parameters) input by a user or the like. Therefore, when a user or the like inputs incorrect set values, a processing that is not intended by the user or the like is executed, and for example, product failures may occur.

As an apparatus that prevents such an unintended processing from being executed, there is known a substrate processing apparatus which includes an input prohibiting device configured to prohibit setting of an input value equal to or less than a lower limit set value in a predetermined step among a plurality of steps (see, e.g., Japanese Patent Laid-Open Publication No. 2010-165729).

SUMMARY

According to an aspect of the present disclosure, a substrate processing system includes a substrate processing apparatus configured to execute a predetermined processing on a substrate accommodated in a processing container, an input receiving unit configured to receive an input of a set value for executing the predetermined processing, and a determination unit configured to determine whether or not the set value received by the input receiving unit is valid based on the set value received by the input receiving unit and a characteristic of the substrate processing apparatus.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

BRIEF DESCRIPTION OF THE DRAWINGS

FIGS. 7A to 7D are views each illustrating exemplary statistical information.

FIG. 8 is a view illustrating an exemplary warning screen.

FIG. 9 is a view illustrating an exemplary warning screen.

DESCRIPTION OF EMBODIMENT

Figure 1:
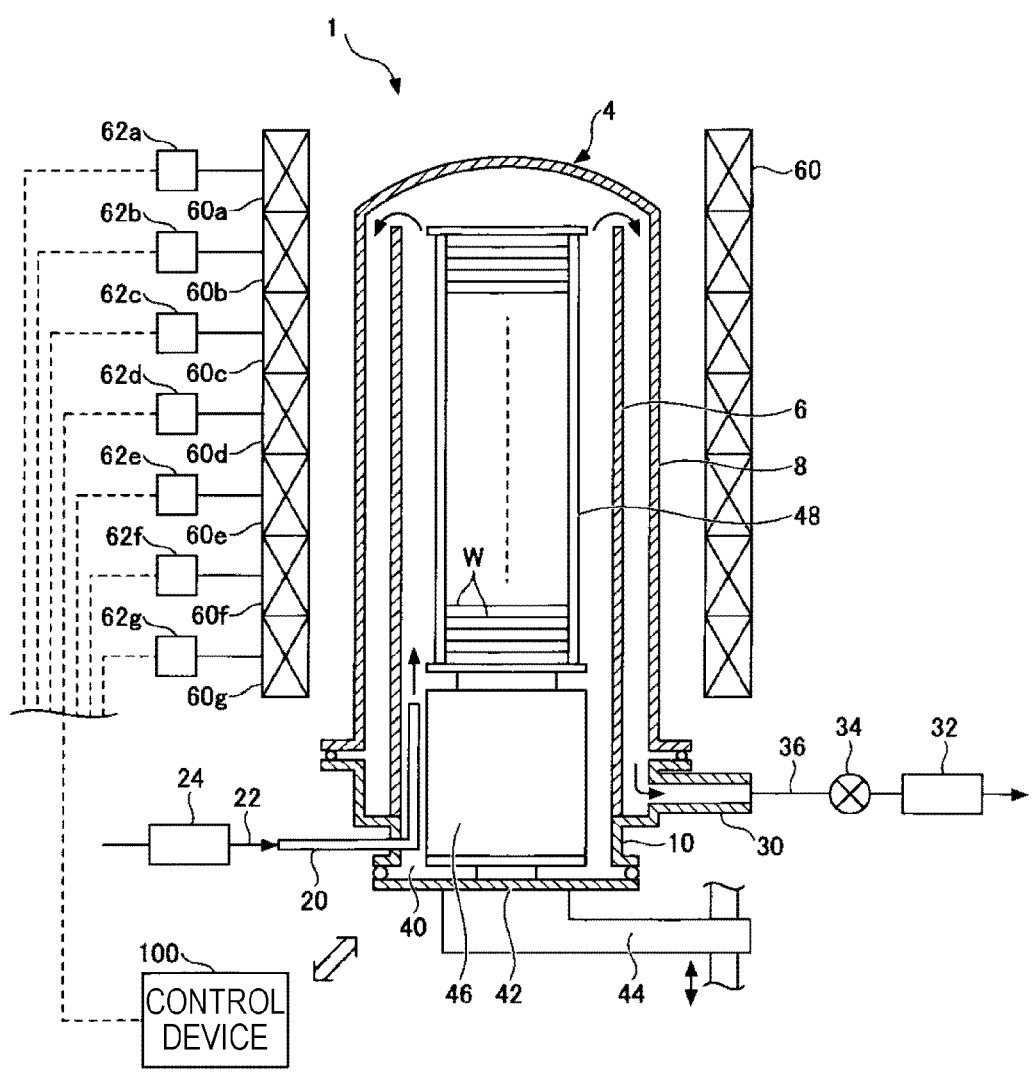
FIG. 1 is a schematic cross-sectional view of a substrate processing system according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

In the above apparatus, since there is a case where it is not possible to properly determine an input error by the user or the like, it is impossible to sufficiently prevent an unintended processing from being executed.

The present disclosure has been made in view of the above, and one solution of the present disclosure is to provide a substrate processing system capable of detecting an input error with high accuracy.

According to an aspect of the present disclosure, a substrate processing system includes a substrate processing apparatus configured to execute a predetermined processing on a substrate accommodated in a processing container, an input receiving unit configured to receive an input of a set value for executing the predetermined processing, and a determination unit configured to determine whether or not the set value received by the input receiving unit is valid based on the set value received by the input receiving unit and characteristics of the substrate processing apparatus.

The above-described substrate processing system further includes a second determination unit configured to determine whether or not the set value received by the input receiving unit is valid based on the set value received by the input receiving unit and statistical information based on previously input set values.

The above-described substrate processing system further includes a first calculation unit configured to calculate the characteristic of the substrate processing apparatus.

The above-described substrate processing system further includes a second calculation unit configured to calculate statistical information based on previous set values in a recipe which is the same as a recipe received by the input receiving unit.

The above-described substrate processing system further includes a storage unit configured to store the previously input set values in association with the recipe.

The above-described substrate processing system further includes a warning output unit configured to output a warning message when it is determined that the set value received by the input receiving unit is not valid.

In the above-described substrate processing system, the substrate processing apparatus includes a heater configured to heat each of a plurality of divided zones, and wherein the characteristic of the substrate processing apparatus is a relationship between each zone and a set temperature of the heater.

In the above-described substrate processing system, the statistical information is calculated based on the previous set values in the recipe which is the same as the recipe received by the input receiving unit.

According to an aspect of the present disclosure, there is provided a control device that controls a substrate processing apparatus that executes a predetermined processing on a substrate accommodated in a processing container. The control device includes: an input receiving unit configured to receive an input of a set value for executing the predetermined processing; and a determination unit configured to determine whether or not the set value received by the input receiving unit is valid based on the set value received by the input receiving unit and a characteristic of the substrate processing apparatus.

According to an aspect of the present disclosure, provided is a group controller connected to a control device that controls a substrate processing apparatus configured to execute a predetermined processing on a substrate accommodated in a processing container. The group controller comprising: an input receiving unit configured to receive an input of a set value for executing the predetermined processing; and a determination unit configured to determine whether or not the set value received by the input receiving unit is valid based on the set value received by the input receiving unit and characteristics of the substrate processing apparatus.

According to an aspect of the present disclosure, there is provided a host computer connected to a control device that controls a substrate processing apparatus that executes a predetermined processing on a substrate accommodated in a processing container. The host computer includes: an input receiving unit configured to receive an input of a set value for executing the predetermined processing; and a determination unit configured to determine whether or not the set value received by the input receiving unit is valid based on the set value received by the input receiving unit and a characteristic of the substrate processing apparatus.

According to the disclosed substrate processing system, it is possible to detect an input error with high accuracy.

Hereinafter, an exemplary embodiment for carrying out the present disclosure will be described with reference to the drawings. Meanwhile, in this specification and drawings, substantially the same components will be given the same reference numerals, and redundant descriptions thereof will be omitted.

(Substrate Processing System)

A substrate processing system of the present disclosure will be described. FIG. 1 is a schematic cross-sectional view of a substrate processing system according to an exemplary embodiment of the present disclosure.

As illustrated in FIG. 1, the substrate processing system includes a substrate processing apparatus 1 and a control device 100.

The substrate processing apparatus 1 is, for example, a batch type apparatus capable of executing a film forming processing collectively on a plurality of substrates accommodated in a processing container 4. The substrates may be, for example, semiconductor wafers (hereinafter referred to as "wafers W").

The control device 100 is, for example, a computer including a central processing unit (CPU), a random access memory (RAM), a read only memory (ROM), and an auxiliary storage device. The CPU operates based on a program stored in the ROM or the auxiliary storage device to control an operation of the substrate processing apparatus 1. The control device 100 may be provided inside or outside the substrate processing apparatus 1. When the control apparatus 100 is provided outside the substrate processing apparatus 1, the control device 100 may control the substrate processing apparatus 1 by, for example, a wired or wireless communication device. In addition, the control device 100 may be connected to a group controller or a host computer, which is a control device that unitarily manages a plurality of apparatuses including the substrate processing apparatus 1 by, for example, the wired or wireless communication device.

(Substrate Processing Apparatus)

As illustrated in FIG. 1, the substrate processing apparatus 1 includes the processing container 4 having a substantially cylindrical shape, the longitudinal direction of which is the vertical direction. The processing container 4 has a double pipe structure including an inner cylinder 6 in the form of a cylindrical body and a ceilinged outer cylinder 8 concentrically disposed outside the inner cylinder 6. The inner cylinder 6 and the outer cylinder 8 are formed of, for example, a heat-resistant material such as quartz.

The inner cylinder 6 and the outer cylinder 8 are held at the lower end portions thereof by a manifold 10, which is formed of, for example, stainless steel. The manifold 10 is fixed to, for example, a base plate (not illustrated). Meanwhile, because the manifold 10 defines an inner space having a substantially cylindrical shape along with the inner cylinder 6 and the outer cylinder 8, it is assumed that the manifold 10 forms a portion of the processing container 4. That is, the processing container 4 includes the inner cylinder 6 and the outer cylinder 8, which are formed of, for example, a heat-resistant material such as quartz, and the manifold 10, which is formed of, for example, stainless steel, and the manifold 10 is provided on the lower portion of the side surface of the processing container 4 so as to hold the inner cylinder 6 and the outer cylinder 8 from the lower side thereof.

The manifold 10 has a gas introduction part 20 configured to introduce various gases such as, for example, a processing gas such as a film forming gas used in a film forming processing and an additive gas, and a purge gas used in a purge processing, into the processing container 4. Although FIG. 1 illustrates a form in which one gas introduction part 20 is provided, the present disclosure is not limited thereto, and a plurality of gas introduction parts 20 may be provided according to, for example, the type of gas to be used.

The kind of the processing gas is not particularly limited, but may be properly selected according to, for example, the type of a film to be formed, and may be, for example, a silicon-containing gas.

The type of the purge gas is not particularly limited, and may use an inert gas such as, for example, nitrogen ($N_2$) gas.

The gas introduction part 20 is connected to an introduction pipe 22 that is configured to introduce various gases into the processing container 4. Meanwhile, the introduction pipe 22 is provided with, for example, a flow rate adjustment unit 24 such as, for example, a mass flow controller, for adjusting a gas flow rate, or a valve (not illustrated).

In addition, the manifold 10 includes a gas exhaust part 30 configured to evacuate the inside of the processing container 4. The gas exhaust part 30 is connected to an exhaust pipe 36, which includes, for example, a vacuum pump 32 capable of controlling the reduction of pressure within the processing container 4, and a variable opening valve 34.

The lower end portion of the manifold 10 is formed with a furnace opening 40, and the furnace opening 40 is provided with a cover 42, which has a disc shape and is formed of, for example, stainless steel. The cover 42 is provided so as to be movable up and down by, for example, an elevating mechanism 44, which functions as a boat elevator, and is configured to hermetically seal the furnace opening 40.

A heat insulating cylinder 46, which is formed of, for example, quartz, is provided above the cover 42. A wafer boat 48, which is formed of, for example, quartz, is disposed above the heat insulating cylinder 46, which is configured to hold, for example, about 50 to 175 wafers W in the horizontal state at predetermined intervals in multiple stages.

The wafer boat 48 is loaded (carried) into the processing container 4 by moving up the cover 42 using the elevating mechanism 44, and various film forming processings are performed on the wafers W held in the wafer boat 48. After the various film forming processings are performed, the wafer boat 48 is unloaded (carried out) from the inside of the processing container 4 to a loading area below the processing container 4 by moving down the cover 42 using the elevating mechanism 44.

On the outer peripheral side of the processing container 4, a heater 60 having, for example, a cylindrical shape is provided in order to heat the processing container 4 to a predetermined temperature in a controlled manner The heater 60 is divided into a plurality of zones, and heaters 60a to 60g are provided from the top side to the bottom side in the vertical direction. Hereinafter, the zones provided with the heaters 60a, 60b, 60c, 60d, 60e, 60f and 60g are referred to as "TOP", "CTR-5", "CTR-4", "CTR-3", "CTR-2","CTR-1", and "BTM". The heaters 60a to 60g are configured such that the calorific values thereof may be independently controlled by power controllers 62a to 62g, respectively. In addition, the inner wall of the inner cylinder 6 and/or the outer wall of the outer cylinder 8 are provided with temperature sensors (not illustrated) to correspond to the heaters 60a to 60g. Meanwhile, although FIG. 1 illustrates a form in which the heater 60 is divided into seven zones, the present disclosure is not limited thereto. For example, the heater 60 may be divided into six or less zones, or may be divided into eight or more zones, from the top side to the bottom side in the vertical direction. In addition, the heater 60 may not be divided into a plurality of zones.

(Control Device)

The control device 100 according to an exemplary embodiment of the present disclosure will be described. The control device 100 is provided with a recipe editing screen for allowing a user or the like to input a large number of set values such as, for example, recipes and apparatus parameters. Meanwhile, the recipe editing screen may also be provided in the substrate processing apparatus 1, in addition to the control device 100, or may be provided in the substrate processing apparatus 1, instead of the control device 100.

Figure 2:
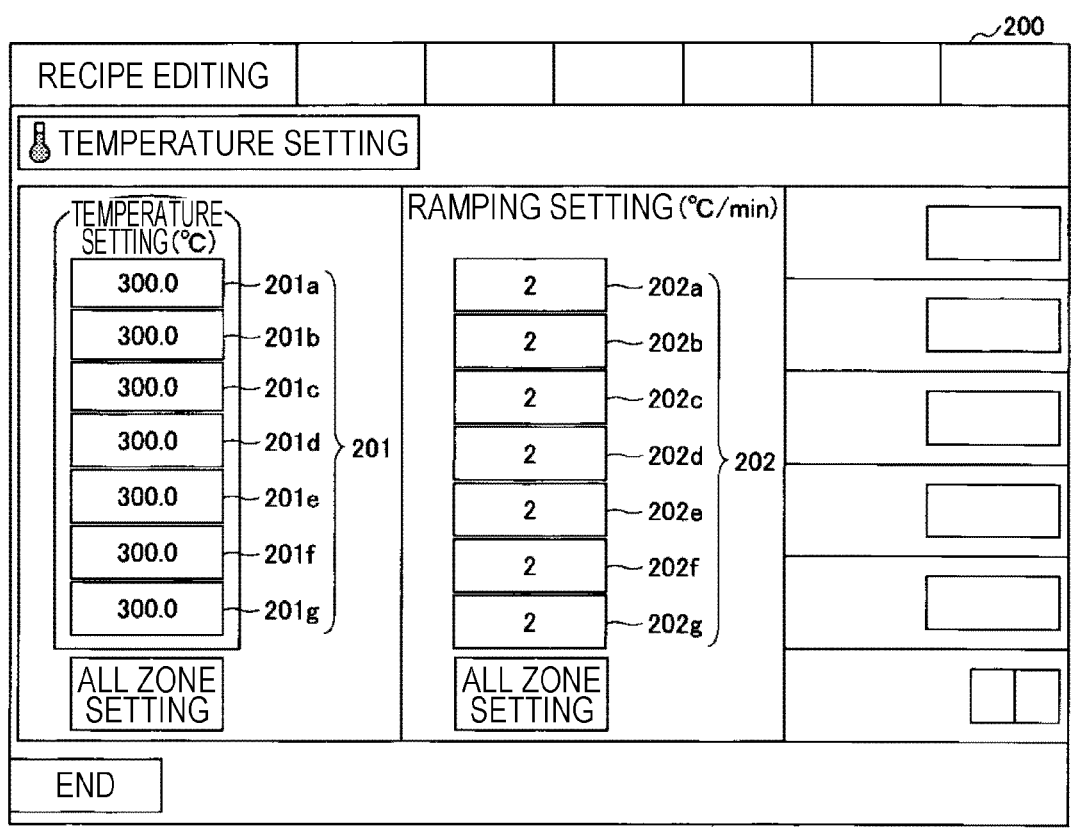
FIG. 2 is a view illustrating an exemplary recipe editing screen of the substrate processing system according to an exemplary embodiment of the present disclosure.

FIG. 2 is a view illustrating an exemplary recipe editing screen of the substrate processing system according to an embodiment of the present invention. As illustrated in FIG. 2, for example, a temperature setting button 201 and a ramping setting button 202 are displayed on the recipe editing screen 200.

The temperature setting button 201 refers to a button that inputs a set temperature (° C.) of the heater 60, and a plurality of buttons is displayed so as to correspond to the number of zones. In the illustrated example, the temperature setting button 201 includes seven temperature setting buttons 201a to 201g. The temperature setting buttons 201a to 201g are used when inputting the set temperatures of the respective heaters 60a to 60g.

The ramping setting button 202 refers to a button that inputs a ramping rate (° C./min), and a plurality of buttons is displayed to correspond to the number of zones. In the illustrated example, the ramping setting button 202 includes seven ramping setting buttons 202a to 202g. The ramping setting buttons 202a to 202g are used when inputting the ramping time of the respective heaters 60a to 60g.

The user or the like inputs a large number of set values (e.g., recipes and apparatus parameters) using the recipe editing screen 200. Thereby, the substrate processing apparatus 1 operates based on the large number of input set values. Therefore, when the user or the like inputs incorrect set values, a processing that is not intended by the user or the like is executed, and for example, a defective product may occur in some cases.

Figure 3:
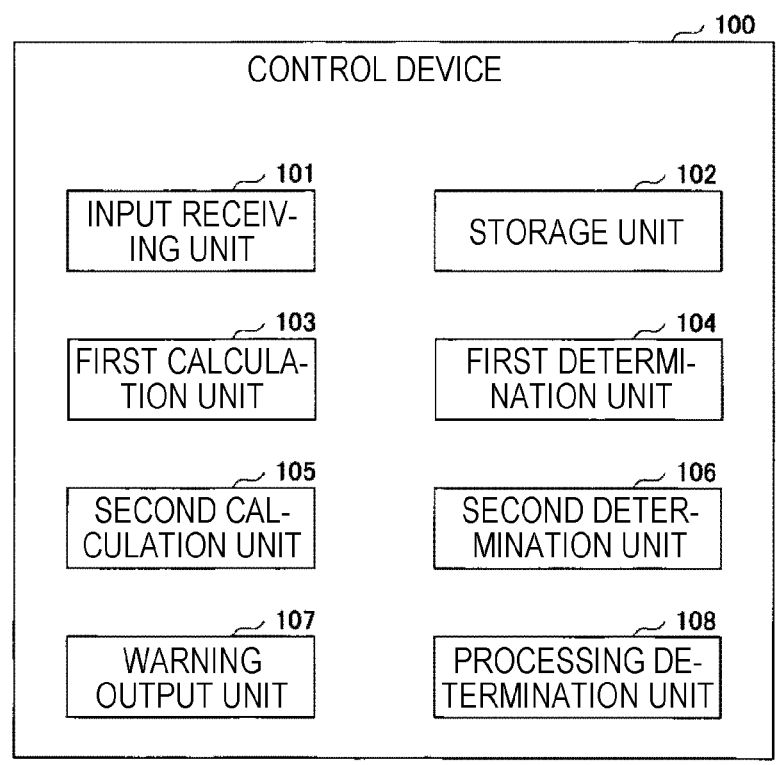
FIG. 3 is a view for explaining a functional configuration of a control device according to an exemplary embodiment of the present disclosure.

Therefore, hereinafter, a specific configuration of the control device 100 according to an exemplary embodiment of the present disclosure, which may automatically determine an input error by a user or the like, will be described. FIG. 3 is a view for explaining a functional configuration of the control device 100 according to an exemplary embodiment of the present disclosure.

As illustrated in FIG. 3, the control device 100 includes an input receiving unit 101, a storage unit 102, a first calculation unit 103, a first determination unit 104, a second calculation unit 105, a second determination unit 106, a warning output unit 107, and a processing determination unit 108.

The input receiving unit 101 determines whether or not a set value has been input by a user or the like. Specifically, when a set value such as, for example, the set temperature of the heater 60 on the recipe editing screen 200 is input or changed by a user or the like, the input receiving unit 101 determines that the set value has been input by the user or the like.

The storage unit 102 stores a set value previously input in association with a recipe. Specifically, as illustrated in FIG. 7A, the storage unit 102 stores, for example, a table, which illustrates an input history ID, a recipe ID, a set temperature (° C.), and the presence or absence of a processing result. The input history ID refers to an ID that is assigned whenever a set value is input by the user or the like. The recipe ID refers to an ID that is assigned to each recipe. The set temperature is an example of the set value. The presence or absence of the processing result is a flag that indicates whether or not a processing has been executed using the recipe, "1" means that the processing has been executed using the recipe, and "0" means that the processing has not been executed even once using the recipe.

Figure 4:
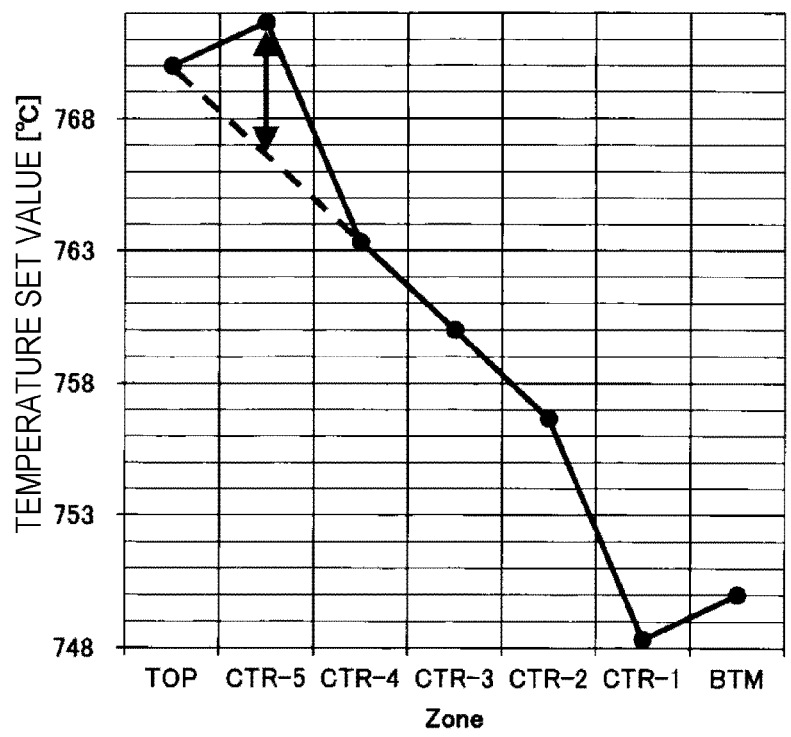
FIG. 4 is a view illustrating temperature set values of respective zones.
Figure 5:
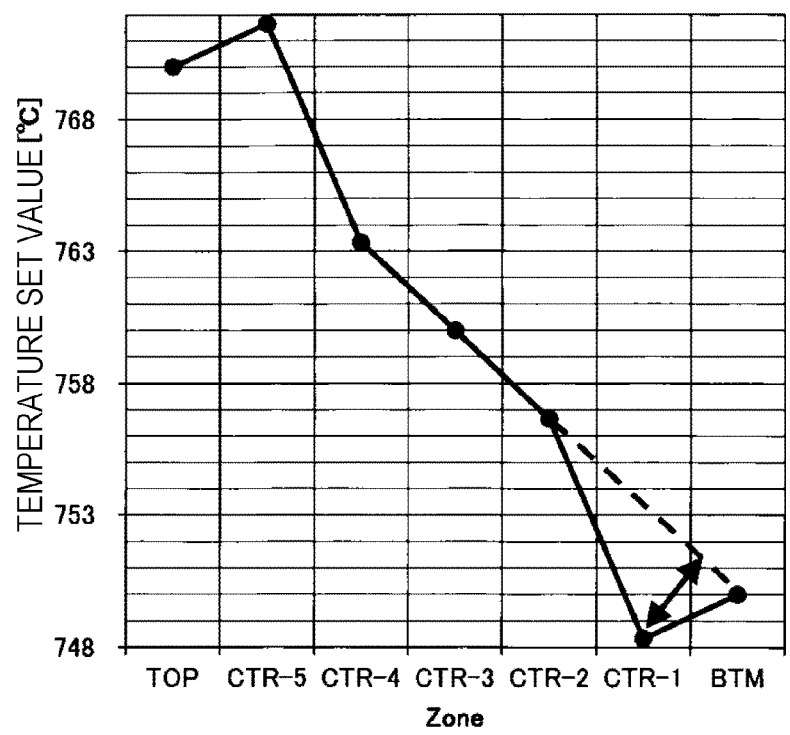
FIG. 5 is a view illustrating temperature set values of respective zones.
Figure 6:
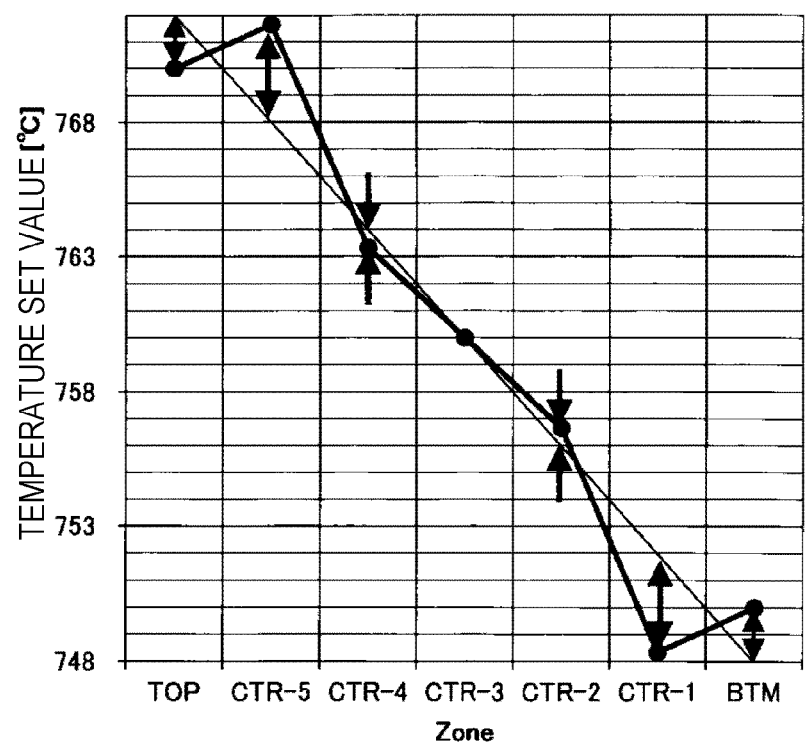
FIG. 6 is a view illustrating temperature set values of respective zones.

The first calculation unit 103 calculates the characteristics of the substrate processing apparatus 1. FIGS. 4 to 6 are views illustrating temperature set values of the respective zones. In the drawings, the horizontal axis represents the zones and the vertical axis represents the temperature set values (° C.). For example, as illustrated in FIG. 4, when the input receiving unit 101 receives an input of the set temperature of "CTR-5", the first calculation unit 103 calculates the difference (indicated by the bidirectional arrow in the drawing) between the temperature in "CTR-5" of the line (indicated by the broken line in the drawing) passing through the set temperatures of "TOP" and "CTR-4", which are two zones adjacent to "CTR-5", and the set temperature of "CTR-5" received by the input receiving unit 101. In addition, for example, as illustrated in FIG. 5, when the input receiving unit 101 receives an input of the set temperature of "CTR-1", the first determination unit 104 calculates the distance (indicated by the bidirectional arrow in the drawing) between the line (indicated by the broken line in the drawing) passing through the set temperatures of "CTR-2" and "BTM", which are two zones adjacent to "CTR-1", and the set temperature of "CTR-1" received by the input receiving unit 101. In addition, for example, as illustrated in FIG. 6, when the input receiving unit 101 receives an input of the set temperatures of the plurality of zones, the first calculation unit 103 calculates approximate lines (indicated by the solid lines in the drawing) based on the set temperatures of all of the zones, and calculates the distances (indicated by the arrows in the drawing) between the approximate lines and the input values of the respective zones. Meanwhile, the approximate lines calculated based on the set temperatures of all of the zones may be, for example, an exponential function, an $n^{th}$ order function, a logarithmic function, or a power function.

The first determination unit 104 determines whether or not the set value received by the input receiving unit 101 is valid based on the set values received by the input receiving unit 101 and the characteristics of the substrate processing apparatus 1 calculated by the first calculation unit 103.

Specifically, for example, as illustrated in FIG. 4, when the input receiving unit 101 receives an input of the set temperature of "CTR-5", the first determination unit 104 determines that the set value received by the input receiving unit 101 is valid when the difference between the temperature in "CTR-5" of the line passing through the set temperatures of "TOP" and "CTR-4" and the set temperature of "CTR-5" received by the input receiving unit 101, which is calculated by the first calculation unit 103, is equal to or less than a first value. On the other hand, the first determination unit 104 determines that the set value received by the input receiving unit 101 is not valid when the difference between the temperature in "CTR-5" of the line passing through the set temperatures of "TOP" and "CTR-4" and the set temperature of "CTR-5" received by the input receiving unit 101, which is calculated by the first calculation unit 103, is greater than the first value. Meanwhile, the first value refers to a value that is determined in advance by the user or the like.

In addition, for example, as illustrated in FIG. 5, when the input receiving unit 101 receives an input of the set temperature of "CTR-1", the first determination unit 104 determines that the set value of "CRT-1" received by the input receiving unit 101 is valid when the distance between the line passing through the set temperatures of "CTR-2" and "BTM" and the set temperature of "CTR-1" received by the input receiving unit 101 is equal to or less than a second value. On the other hand, the first determination unit 104 determines that the set value of "CRT-1" received by the input receiving unit 101 is not valid when the distance from the set temperature of "CTR-1" received by the input receiving unit 101 is greater than the second value. Meanwhile, the second value refers to a value that is determined in advance by the user or the like.

In addition, for example, as illustrated in FIG. 6, when the input receiving unit 101 receives an input of the set temperatures of the plurality of zones, the first determination unit 104 determines that the set temperatures of the plurality of zones received by the input receiving unit 101 are valid when all of the distances between the approximate lines calculated based on the set temperatures of all of the zones and the input values of the respective zones are equal to or less than a third value. On the other hand, the first determination unit 104 determines that the set temperatures of the plurality of zones received by the input receiving unit 101 are not valid when at least one of the distances between the approximate lines calculated based on the set temperatures of all of the zones and the input values of the respective zones is greater than the third value. Meanwhile, the third value refers to a value that is determined in advance by the user or the like.

The second calculation unit 105 calculates statistical information based on the previously input set values in the same recipe as the recipe received by the input receiving unit 101. FIG. 7 is a view illustrating exemplary statistical information. For example, when a recipe ID of the recipe received by the input receiving unit 101 is "1", the second calculation unit 105, for example, as illustrated in FIG. 7A, calculates statistical information (the average value and standard deviation) of the set values of the input history ID, which is processed with the same recipe ID as the recipe ID received by the input receiving unit 101 and has a processing result, based on the table illustrating the input history ID, the recipe ID, the set value (° C.), and the presence or absence of the processing result stored in the storage unit 102. In addition, the second calculation unit 105 stores the calculated statistical information in the storage unit 102. Thereby, as illustrated in FIG. 7B, the statistical information (the average value and standard deviation) calculated by the second calculation unit 105 is stored in the storage unit 102. In the illustrated example, the average value is 759.8° C., and the standard deviation $1\sigma$ is 0.56° C. In addition, as illustrated in FIG. 7C, the second calculation unit 105 sets the proper range of the set value based on the calculated statistical information (the average value and standard deviation). In the illustrated example, the proper range is set to the average value $\pm 1\sigma$, that is, set such that the upper limit value is 760.36° C. (759.8° C.+0.56° C.) and the lower limit value is 759.24° C. (759.8° C.-0.56° C.).

The second determination unit 106 determines whether or not the set value received by the input receiving unit 101 is valid based on the set value received by the input receiving unit 101 and the proper range calculated by the second calculation unit 105. Specifically, the second determination unit 106 determines that the set value received by the input receiving unit 101 is valid when the set value received by the input receiving unit 101 is within the proper range calculated by the second calculation unit 105 (see "Case-B" in FIG. 7D). On the other hand, the second determination unit 106 determines that the set value received by the input receiving unit 101 is not valid when the set value received by the input receiving unit 101 is not within the proper range calculated by the second calculation unit 105 (see "Case-A" in FIG. 7D).

When at least one of the first determination unit 104 and the second determination unit 106 determines that the set value input by the user or the like is not valid, the warning output unit 107 determines that an input error has occurred, and outputs a warning message including the fact that the set value is not valid. Specifically, when the first determination unit 104 determines that the value input by the user or the like is not valid, for example, as illustrated in FIG. 8, the warning output unit 107 displays "Warning, because there is a zone in which the set value thereof deviates significantly from the set value of the neighboring zone and there is a possibility that it is not proper, please check that this set value is proper or not". In addition, when the second determination unit 106 determines that the value input by the user or the like is not valid, for example, as illustrated in FIG. 9, the warning output unit 107 displays "Warning, because there is the difference of $1\sigma$ or more between this set value and the previously applied set value, and there is a possibility that it is not proper, please check whether this set value is proper".

The processing determination unit 108 determines whether or not an operation of continuing the processing from the user or the like has been received within a predetermined time.

(Input Value Determination Processing)

Figure 10:
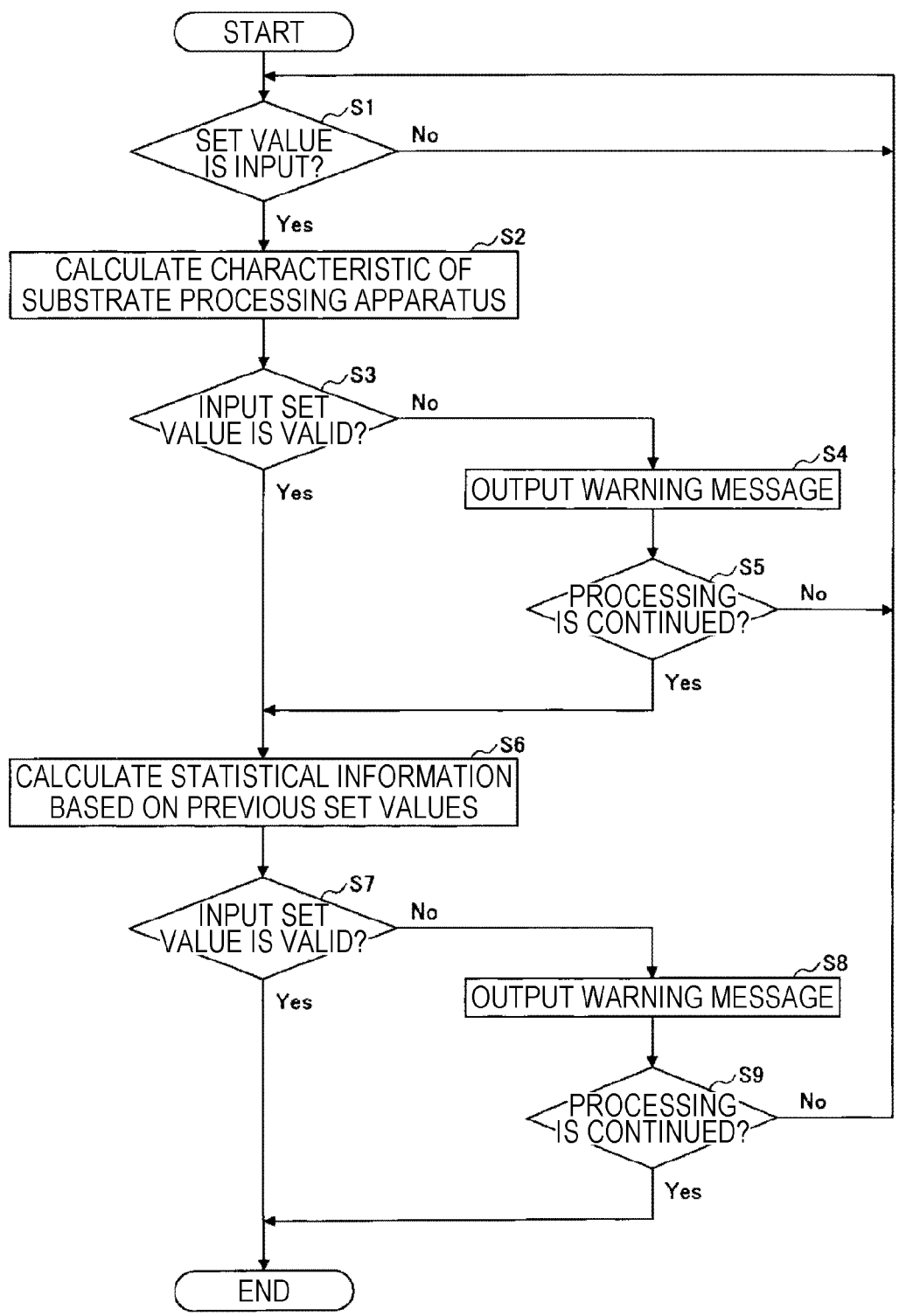
FIG. 10 is a flowchart illustrating an exemplary input value determination processing according to an exemplary embodiment of the present disclosure.

An input value determination processing according to an exemplary embodiment of the present disclosure will be described. FIG. 10 is a flowchart of an exemplary input value determination processing according to an exemplary embodiment of the present disclosure.

In step S1, the input receiving unit 101 determines whether or not a set value has been input by a user or the like. When it is determined in step S1 that the set value has been input by the user or the like, the processing proceeds to step S2. On the other hand, when it is determined in step S1 that the set value is not input by the user or the like, step S1 is repeated again.

In step S2, the first calculation unit 103 calculates the characteristics of the substrate processing apparatus 1.

In step S3, the first determination unit 104 determines whether or not the set value received by the input receiving unit 101 is valid based on the set value received by the input receiving unit 101 and the characteristics of the substrate processing apparatus 1 calculated by the first calculation unit 103. In step S3, when it is determined that the set value received by the input receiving unit 101 is valid, the processing proceeds to step S6. On the other hand, when it is determined in step S3 that the set value received by the input receiving unit 101 is not valid, the processing proceeds to step S4.

In step S4, the warning output unit 107 outputs a warning message including the fact that the set value is not valid. By checking the warning message output from the warning output unit 107, the user or the like may easily and quickly determine whether or not the input set value is due to an input error. In addition, after checking the warning message, the user or the like may perform an operation of continuing the processing when the input set value is not an input error.

In step S5, the processing determination unit 108 determines whether or not the operation of continuing the processing by the user or the like has been received within a predetermined time. When it is determined in step S5 that the operation of continuing the processing by the user or the like has been received within the predetermined time, the processing proceeds to step S6. On the other hand, when it is determined in step S5 that the operation of continuing the processing by the user or the like has not been received within the predetermined time, the processing proceeds to step S1.

In step S6, the second calculation unit 105 calculates statistical information based on the previously input set values in the same recipe as the recipe received by the input receiving unit 101.

In step S7, the second determination unit 106 determines whether or not the set value received by the input receiving unit 101 is valid based on the set value received by the input receiving unit 101 and the proper range calculated by the second calculation unit 105. When it is determined in step S7 that the set value received by the input receiving unit 101 is valid, the processing is terminated. On the other hand, when it is determined in step S7 that the set value received by the input receiving unit 101 is not valid, the processing proceeds to step S8.

In step S8, the warning output unit 107 outputs a warning message including the fact that the set value is not valid. By checking the warning message output from the warning output unit 107, the user or the like may easily and quickly determine whether or not the input set value is due to an input error. In addition, after confirming the warning message, for example, when the user or the like determine that the input set value is not an input error, the user or the like may perform an operation of continuing the processing.

In step S9, the processing determination unit 108 determines whether or not the operation of continuing the processing by the user or the like has been received within a predetermined time. When it is determined in step S9 that the operation of continuing the processing by the user or the like has been received within the predetermined time, the processing is terminated. On the other hand, when it is determined that the operation of continuing the processing by the user or the like is not received within the predetermined time, the processing proceeds to step S1.

As described above, in the exemplary embodiment of the present invention, the control device 100 determines whether or not the set value input by the user or the like is valid based on the characteristics of the substrate processing apparatus 1 and the statistical information of the previously input set values. Thereby, the control device 100 may automatically determine an input error. As a result, the user or the like may safely operate the substrate processing apparatus 1.

In addition, when the set value input by the user or the like is not valid, the control device 100 displays a warning message including the fact that the set value is not valid to notify the same to the user or the like. Thereby, even when the user or the like inputs an incorrect set value, the user or the like may easily and quickly grasp an input error. Therefore, it is possible to prevent execution of a processing that is not intended by the user or the like based on the incorrect set value. As a result, it is possible to prevent occurrence of, for example, a defective product due to an input error, and to suppress deterioration in product yield. In addition, it is possible to increase the operation rate of the apparatus by reducing the apparatus downtime due to an input error Although the exemplary embodiment has been described with reference to a case where the control device 100 that controls an operation of the substrate processing apparatus 1 performs the input value determination processing by way of example, the present disclosure is not limited thereto. For example, a group controller or a host computer connected to the control device 100 by, for example, a wired or wireless communication device may execute the input value determination processing.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A substrate processing system comprising:
 a substrate processing apparatus configured to execute a predetermined processing on a substrate accommodated in a processing container; and
 a controller configured to control the substrate processing system,
  wherein the controller is configured to:

receive an input of a set value for executing the predetermined processing, wherein the set value is input by a user; and determine whether or not the received set value is valid based on the received set value and a characteristic of the substrate processing apparatus, and wherein the controller is configured to determine that the received set value is valid when a difference between the received set value and a target value obtained based on the characteristic of the substrate processing apparatus is equal to or smaller than a threshold value.

2. The substrate processing system of claim 1, wherein the controller is further configured to:

determine whether or not the received set value is valid based on the received set value and statistical information based on previously input set values.

3. The substrate processing system of claim 2, wherein the controller is further configured to:

calculate statistical information based on previous set values in a recipe which is the same as a recipe received by the controller.

4. The substrate processing system of claim 3, wherein the controller is further configured to:

store the previously input set value inputs in association with the recipe.

5. The substrate processing system of claim 3, wherein the statistical information is calculated based on the previous set values in the recipe which is the same as the recipe received by the controller.

6. The substrate processing system of claim 1, wherein the controller is further configured to:

calculate the characteristic of the substrate processing apparatus.

7. The substrate processing system of claim 1, wherein the controller is further configured to:

output a warning message when it is determined that the received set value is not valid.

8. The substrate processing system of claim 1, wherein substrate processing apparatus includes a heater configured to heat each of a plurality of divided zones, and the characteristic of the substrate processing apparatus is a relationship between each zone and a set temperature of the heater.

9. A control device that controls a substrate processing apparatus that executes a predetermined processing on a substrate accommodated in a processing container, the control device comprising:

a memory; and a processor coupled to the memory and configured to:

receive an input of a set value for executing the predetermined processing, wherein the set value is input by a user; and determine whether or not the received set value is valid based on the received set value and a characteristic of the substrate processing apparatus, and wherein the processor is further configured to determine that the received set value is valid when a difference between the received set value and a target value obtained based on the characteristic of the substrate processing apparatus is equal to or smaller than a threshold value.

10. A group controller connected to a control device that controls a substrate processing apparatus configured to execute a predetermined processing on a substrate accommodated in a processing container, the group controller comprising:

a memory; and a processor coupled to the memory and configured to:

receive an input of a set value for executing the predetermined processing, wherein the set value is input by a user; and determine whether or not the received set value is valid based on the received set value and a characteristic of the substrate processing apparatus, and wherein the processor is further configured to determine that the received set value is valid when a difference between the received set value and a target value obtained based on the characteristic of the substrate processing apparatus is equal to or smaller than a threshold value.

11. A host computer connected to a control device that controls a substrate processing apparatus that executes a predetermined processing on a substrate accommodated in a processing container, the host computer comprising:

a memory; and a processor coupled to the memory and configured to:

receive an input of a set value for executing the predetermined processing, wherein the set value is input by a user; and determine whether or not the received set value is valid based on the received set value and a characteristic of the substrate processing apparatus, and wherein the processor is configured to determine that the received set value is valid when a difference between the received set value and a target value obtained based on the characteristic of the substrate processing apparatus is equal to or smaller than a threshold value.

* * * * *